United States Patent [19]
Kim

[11] Patent Number: 6,059,907
[45] Date of Patent: May 9, 2000

[54] PROCESS FOR PREPARING INCOMBUSTIBLE BOARD FOR INTERIOR DECORATION AND FACING OF ARCHITECTURES

[76] Inventor: Kyung Sun Kim, No.1107, 1-Dong, Daerim Apt. 277, Nokbeon-dong, Seoul, Rep. of Korea

[21] Appl. No.: 09/049,946

[22] Filed: Mar. 30, 1998

[30] Foreign Application Priority Data

Feb. 5, 1998 [KR] Rep. of Korea .......................... 98-3175

[51] Int. Cl.$^7$ ..................................................... B32B 31/20
[52] U.S. Cl. ............................... 156/45; 156/39; 156/153; 156/346
[58] Field of Search ............................... 156/39, 45, 153, 156/346; 106/632

[56] References Cited

U.S. PATENT DOCUMENTS

| | | | |
|---|---|---|---|
| 5,256,222 | 10/1993 | Shepherd et al. | 156/41 |
| 5,853,662 | 12/1998 | Watanabe | 422/40 |
| 5,993,920 | 11/1999 | Kim | 428/15 |

FOREIGN PATENT DOCUMENTS 671811A  3/1994  Japan .

*Primary Examiner*—Sam Chuan Yao
*Attorney, Agent, or Firm*—Birch, Stewart, Kolasch Birch, LLP

[57] ABSTRACT

Activated clay is mixed with fine sawdust and/or powder of the heart of kaoliang stalk, a small amount of a coloring agent and bittern containing calcium sulfate, calcium silicate, magnesium or magnesium chloride and the like, or a composition of components identical to the bittern in a paste phase. Then, the paste phase mixture is supplied together with glass fiber layers provided on the upper and the lower sides of the mixture separately on any one of molding plates selected from glass, acryl, polycarbonate, polyvinyl chloride or polypropylene. The materials of the molding plates, in situ, are passed through mixture-separative sandwich rollers to give a certain thickness of a mixture sheet by pressing. The surface of the mixture sheet is coated with an epoxy resin layer to provide a flat and slick surface. On the epoxy resin layer an adhesive layer, transfer film layer, ultraviolet curable adhesives and a protection film layer are coated by adherence in turn to provide an incombustible board. This board is manufactured by a brief and convenient process. Many kinds of materials are not needed, the resulting products are firm and light and, on the surface of the products, multiple color designs can be exposed selectively.

1 Claim, 1 Drawing Sheet

PROCESS FOR PREPARING INCOMBUSTIBLE BOARD FOR INTERIOR DECORATION AND FACING OF ARCHITECTURES

FIELD AND BACKGROUND OF THE INVENTION

The present invention relates to a process for preparing boards for interior decoration and architectural facings and to boards prepared in accordance with the process.

Processes for preparing gypsum boards by mixing gypsum with water, or processes for preparing boards or slates by mixing any material selected from wooden particles, asbestos, stone powder, cement, and the like with an adhesive or water are known in several forms.

However, in the case of the above-stated gypsum or stone powder boards, they are broken easily by slight shocks because the bending strength (moment) thereof is weak (low). In case of said wooden particle boards, the wooden particles as raw materials thereof are expensive, combustible and not easily collectible. Said asbestos is a pollutant and cement boards are heavy and can not be bent.

Further, since said conventional boards cannot have flat and slick surfaces, multiple-color design cannot be transferred thereon distinctly and selectively by hot stamping or roller coating unless the colors are restricted to black and white.

DESCRIPTION OF THE PRIOR ART

Conventional boards used for architecture are combustible, are not bent easily, are pollutants and/or can not have selective multiple surface color designs.

Examples of the above-mentioned prior art are as follows:

Examples of fire-resistant or light weight boards used for architecture are disclosed in Korean Laid-open patent publication No. 89-9801, filed by Kumkang Co., Ltd and Korean Laid-open patent publication No. 92-6105, filed by Manvil corporation (U.S. applications Ser. Nos. 07/579,754, and 07/744,543).

The former is a fire-resistant gypsum board and a process for preparation thereof in which a slurry of mixed gypsum, aluminum sulfate, glass fiber, starch, water and minerals of needle-shape such as Edenite, Wallastonite and Sillimanite are placed between a surface paper and a rear paper and are cured.

However, such a board has only fire-resistance, does not have incombustibility, is heavy, and can not have distinct multiple color patterns.

The latter is a light board useful for architecture comprising a mixture of expandable silicate mineral particles such as expandable perlite, mineral binder such as sodium silicate, water, silicon, magnesium chloride, magnesium sulfate and hardener, and pressed into a layer between facing sheets such as glass fiber on both surfaces of said layer.

However such a board is only light and can not have distinct multiple color patterns.

SUMMARY OF THE INVENTION

It is an object of the present invention to provide incombustible and flexible boards having selective, multiple color designs for interior decoration and architectural facings.

Particularly, the present invention relates to boards being molded by mixing activated clay with a small amount of fine sawdust and/or powder of the heart of kaoliang stalk, a coloring agent, and bittern containing calcium sulfate, calcium silicate, magnesium, magnesium chloride and the like or a composition of components identical to said bittern.

DETAILED DESCRIPTION OF PREFERRED EMBODIMENTS

Figure 1:
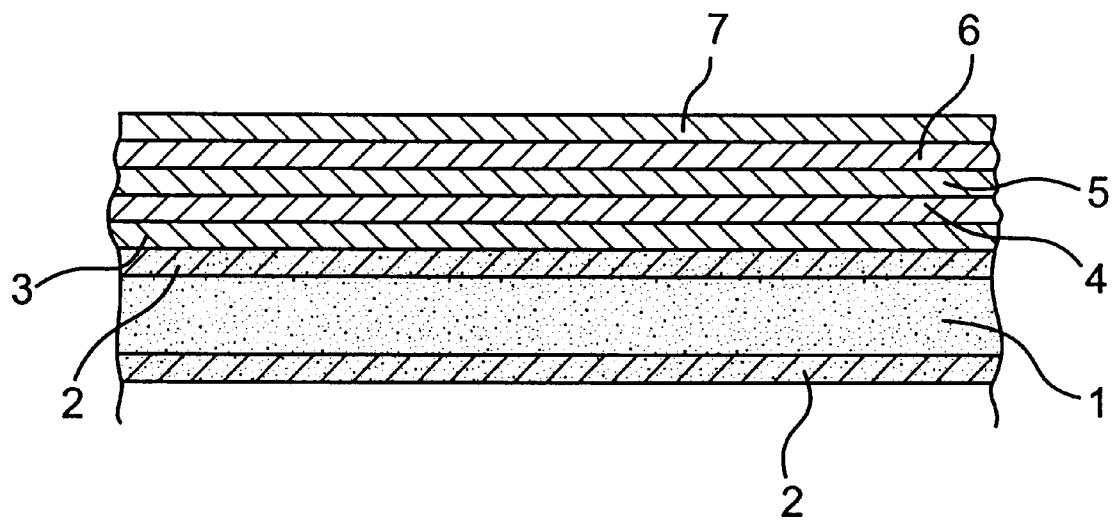
FIG. 1 is a cross sectional view of a board in accordance with the present invention.

Referring to FIG. 1, there is shown a cross-sectional view of a board in accordance with the present invention.

A process for preparing boards of the present invention will now be described in detail as follows, referring to the accompanying drawings.

Activated clay is mixed with a small amount of fine sawdust and/or powder of the heart of kaoliang stalk, a small amount of coloring agent and bittern obtained by water absorption of crude sodium chloride containing calcium sulfate, calcium silicate, magnesium, magnesium chloride and the like or a composition of components identical to said bittern to give a paste phase mixture 1. This paste phase mixture 1 is supplied together with a top glass fiber layer 2, and bottom glass fiber layer 3 being provided on the upper and the lower sides of said mixture 1. The top glass fiber 2 and bottom glass fiber 3 are provided separately on any one of molding plates selected from glass, acryl, polycarbonate, polyvinyl chloride or polypropylene plates. The materials of said molding plates, in situ, are passed continuously through mixture-separative sandwich rollers to give a certain thickness of a mixture sheet by pressing. Then, said sheet is dried at ambient temperature in the summer or by hot air in a drying furnace of inner temperature 40–50° C. for approximately 10 hours in the winter. The surface of said dried sheet is ground with sand paper. On the ground surface, an epoxy resin layer 4 is coated evenly and an adhesive layer 5, a multiple color design transfer film layer 6, an ultraviolet curable adhesive layer 7 and a protection film layer 8 are coated in turn by adherence. The resulting products are cut to the needed size to give light, hard, bendable incombustible boards for interior decoration and architectural facings.

The present boards, in accordance with the present invention as described above, have excellent hardness and are light and incombustible since the activated clay forming the boards contains mineral oxide components such as silicon oxide ($SiO_2$), aluminum oxide ($Al_2O_3$), magnesium oxide (MgO), calcium oxide(CaO), sodium oxide($Na_2O$) and the like.

Also due to glass fibers contained in the boards, they are incombustible, inert, and have excellent insulation properties and bending moments.

Accordingly the boards are not broken during handling and working, and they can be constructed easily even onto bent surfaces.

Bittern, contained in said boards, composed of minerals or mineral salts such as calcium sulfate, calcium silicate, magnesium and magnesium chloride is mixed easily with said activated clay to have excellent coherence and coagulating force. Thus, the resulting products have good bending moment, handle easily and construct easily even on bent surfaces.

Furthermore, since the surface of the mixture sheet is ground and is coated by an epoxy resin layer 4 and by the adhesive 5, the surface of the resulting products are firm and flat. Thus the surface of the end products appear by transference to have minute and multiple color designs similar to natural color.

In addition, because of the ultraviolet curable adhesive layer 7 protecting the surface of the boards, said transfer film layer 5 is not oxidated to change color. Also, due to the protection film layer 8, the distinct surface color design of the board is always maintained.

What is claimed is:

1. A process for preparing incombustible board for interior decoration and architectural facings comprising:

mixing activated clay with a small amount of fine sawdust and/or powder of the heart of kaoliang stalk, a small amount of coloring agent and bittern obtained by water absorption of crude sodium chloride containing calcium sulfate, calcium silicate, magnesium, magnesium chloride or a composition of components identical to said bittern to give a paste phase mixture;

supplying said paste phase mixture together with a top glass fiber layer and a bottom glass fiber layer being provided on the upper and the lower sides of said mixture separately on any one of molding plates selected from glass, acryl, polycarbonate, polyvinyl chloride or polypropylene plates;

passing the materials of said molding plates, in situ, between mixture-separative sandwich rollers to give a certain thickness of a mixture sheet by pressing;

drying said sheet;

grinding the surface of said dried sheet with sand paper;

coating an epoxy resin layer evenly on the ground surface;

coating an adhesive layer, a multiple color design of transfer film layer, an ultraviolet curable adhesive layer and a protection film layer on the epoxy resin layer in turn by adherence; and cutting the resulting products into needed size to give light, hard, bendable, incombustible boards for interior decoration and architectural facings.

* * * * *